F. CLEMENT.
EMERGENCY SPINDLE FOR AUTOMOBILES.
APPLICATION FILED MAR. 30, 1915.

1,174,475.

Patented Mar. 7, 1916.
2 SHEETS—SHEET 1.

Witnesses
W. H. Woodson
W. H. Woodman

Inventor
F. Clement

By
Attorneys

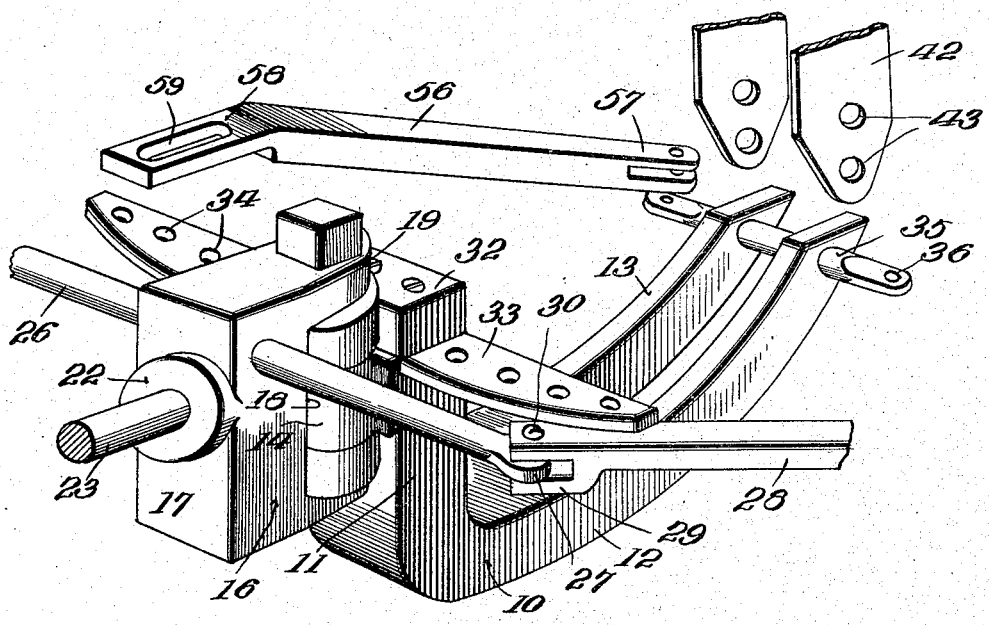
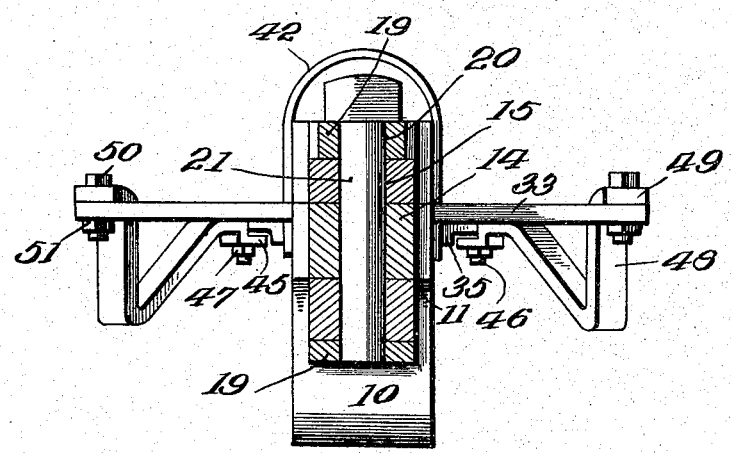

UNITED STATES PATENT OFFICE.

FRANK CLEMENT, OF SWEET WATER, TEXAS.

EMERGENCY-SPINDLE FOR AUTOMOBILES.

1,174,475. Specification of Letters Patent. Patented Mar. 7, 1916.

Application filed March 30, 1915. Serial No. 18,124.

*To all whom it may concern:*

Be it known that I, FRANK CLEMENT, a citizen of the United States, residing at Sweet Water, in the county of Nolan and State of Texas, have invented certain new and useful Improvements in Emergency-Spindles for Automobiles, of which the following is a specification.

My invention relates to new and useful improvements in wrecking devices for vehicles, and more particularly to a detachable spindle device which may be applied to either a front or rear axle to replace a broken spindle or steering knuckle and to which a conventional form of vehicle wheel may be applied, the primary object of my invention consisting in the provision of a device of the above described character which may be applied either to a front or rear wheel or to a wheel upon either side of the vehicle.

A still further object of my invention consists in constructing the device in such a manner that it may be applied irrespective of any brake drums, brake rods or radius rods with which the vehicle may be supplied, thereby making it applicable to motor vehicles of all types and makes.

A still further object of my invention is to construct the above described device in such a manner that when used upon a forward axle, the wheel which it carries may be turned in the same manner in which the ordinary steering wheel would be turned, a steering knuckle being provided to admit this and a link being provided for connecting the steering knuckle to the drag link of the steering gear of the vehicle.

A still further object of my invention is to so construct the link which connects the steering knuckle with the drag link of the steering mechanism that when the device is applied to rear axles, this same link may be utilized for connection with a spring, brake rod or other like portion of the vehicle to hold the steering knuckle against turning movement.

With these and other objects in view, my invention will be more fully described, illustrated in the accompanying drawings, and then specifically pointed out in the claims which are attached to and form a part of this application.

Figure 1:
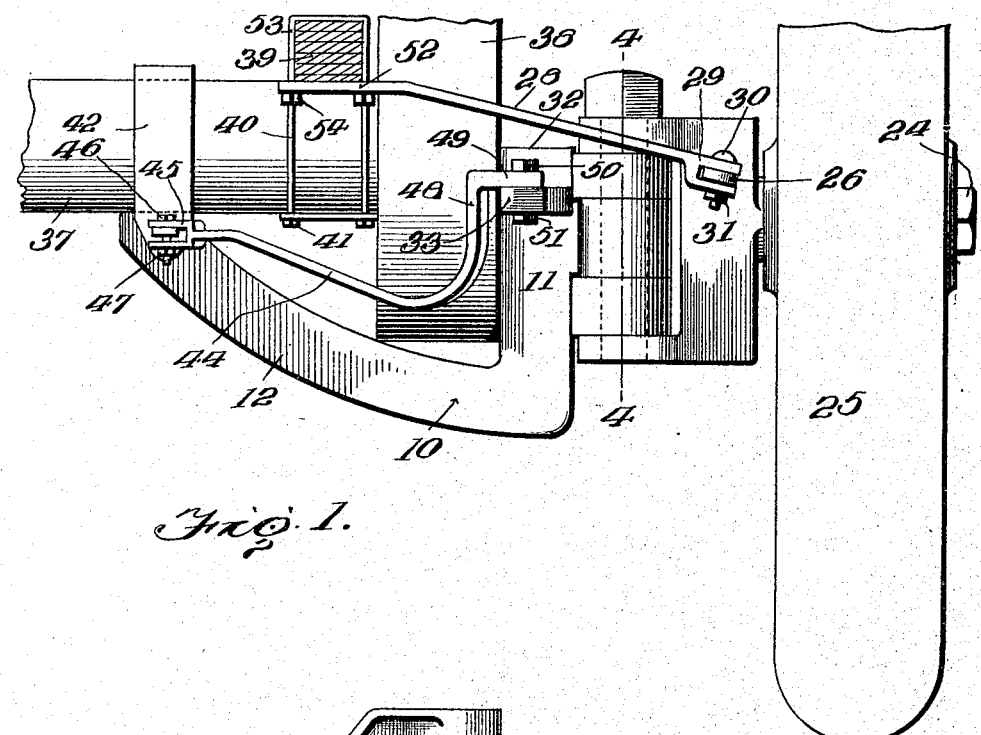
Figure 2:
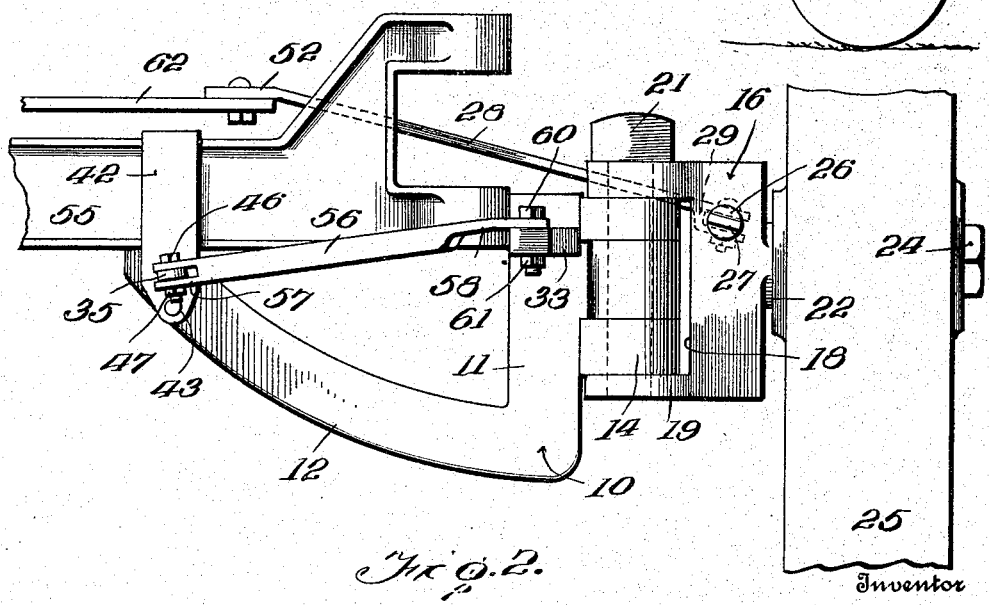

In the drawings: Figure 1 is a fragmentary front elevational view of my improved device applied to the rear axle of a motor vehicle; Fig. 2 is a similar view, showing the device in use in connection with a front axle; Fig. 3 is a perspective view of the body portion and certain of the detachable portions of my device; Fig. 4 is a vertical sectional view taken on the line 4—4 of Fig. 1, looking in the direction of the arrows.

Corresponding and like parts are referred to in the following description and indicated in all the views of the drawings by the same reference characters.

The body portion 10 of my device includes a vertically disposed head 11 provided at its lower end with a laterally and upwardly curved supporting arm 12, the free end portion of which is bifurcated to provide spaced sides 13. The head, at that side opposite the arm 12, is provided with a laterally directed cylindrical extension 14 provided centrally with a vertical bore 15 and forming a portion of a steering knuckle, indicated as a whole by the numeral 16. The remaining portion of this steering knuckle includes a head 17 cut-away at 18 to form a seat for the extension 14 and spaced ears 19 adapted to extend one above and one below such extension 14. These ears are formed with openings 20 adapted to aline with the opening 15 to receive a pivot pin or bolt 21 by means of which the head 17 is pivotally connected to the extended portion of the body 10. This head 17, at its outer end, is provided with a cylindrical boss 22 and extending centrally from this boss is a wheel receiving spindle 23, the free end of which is adapted to receive a nut 24 when a wheel 25 is mounted thereon.

The head 17 is formed with a transverse bore extending at right angles to the axis of the spindle 23 and at a level slightly above the same to receive a rod 26 formed at each end with an eye 27 and a link 28 is provided with a forked head 29 at one end to straddle either of these eyes in such a manner that the link 28 may be pivotally connected to either end of the rod by a pivot pin in the form of a bolt 30 having a nut 31.

Secured to the upper end of the portion 11 of the body member, is a block or head 32 provided with arms 33 which project from either side of the body member to extend in parallel spaced relation to the rod 26 when the spindle 23 is in alinement with the body 10. These arms 33 are provided each with a series of bolt receiving openings 34, for a purpose which will be later explained. A rod 35 is passed through alined openings formed in the free ends of the sides of the arm 12, this rod being formed at each end with an eye 36.

Having thus described the main body portion and permanently connected parts thereof, I will now explain the remaining portions in connection with its application to a vehicle axle, assuming first that the device is to be applied to a rear axle, as shown in Fig. 1, and subsequently that the device is to be applied to a forward axle, as shown in Fig. 2. In Fig. 1, 37 indicates the rear axle housing having at either end brake drums 38, leaf springs 39 of the vehicle being connected directly to the rear axle housing by U-shaped clips 40 and nuts 41, as is usual in motor vehicle construction. In applying my device to the rear axle of a vehicle, in which the spindle has been broken, the ordinary vehicle wheel and spindle are removed and the body of my device positioned with the free ends of its side portion 13 beneath the axle housing and with the inner face of its head portion 11 disposed against the outer portion of the brake drum 38, the peripheral edge of the brake drum seating upon that portion of the body 12 adjacent the head 11. A U-shaped clip 42, preferably formed of resilient metal, is provided adjacent its free ends with openings 43 to receive the ends of the rod 35, a number of these openings being provided in order that the clip may be used with vehicles having axles of varying sizes. As shown in Fig. 1, the lower ends of this clip 42 bear against the outer faces of the side portions 13 of the body, when in place.

Supporting braces 44 are connected at their outer ends to the lateral extensions 33 of the head and at their inner ends to the ends of the rod 35, these inner ends being bifurcated, as shown at 45, to receive the eyes 36 and perforated to receive pivot bolts 46 having nuts 47. As best shown in Figs. 1 and 4 of the drawings, these supporting braces 44 curve downwardly from their inner ends to engage the periphery of the brake drum 38 and at their outer ends are upbent, as shown at 48, and then laterally extended as shown at 49 to bear upon the upper faces of the extended portions 33 of the body of the device. These portions 49 of the supporting braces are provided with bolt receiving openings in order that bolts 50 may be passed through them and through the outermost of the openings 34 in the extensions to receive nuts 51 by which the supporting braces are secured in place.

As will be apparent, the intermediate portion of the arm 12, together with the head and the supporting braces 44, form in effect a cradle to receive the brake drum 38 and to, because of the imposed weight of the vehicle upon the device, hold the latter against any forward or rearward swinging movement with respect to the rear axle of the vehicle. The free end of the link 28, which link is preferably inclined upwardly somewhat, is bent, as shown at 52, to extend in a horizontal plane and is provided with openings to receive the arms of a U-shaped clip 53 passed about the leaf spring 39, which arms are threaded to receive clamp nuts 54. By this means, the link 28 serves to prevent any swinging movement of the spindle with respect to the body of the device and it will be clear that the link may be employed with the device irrespective of the type of vehicle as its effective length may be varied at will by connecting it to the spring at the proper distance from the rear axle. It should further be noted that the mere attaching of the supporting braces 44 to the rod 35 serves to prevent any release of the U-shaped clip 42 from the rod 35.

When the device is employed as a wrecking spindle for a front wheel, it is positioned at the end of the forward axle 55 of the vehicle in the manner shown in Fig. 2 with the upper portion of its head engaging against the end of the axle and with the clip 42 locked about the axle in the manner previously described. Under these circumstances, however, the curved supporting braces 44 are preferably replaced by straight braces 56 formed at one end with fork arms 57 to receive the eyes of the rod 35 and at their other ends with angularly disposed flattened terminals 58 adapted to engage over the upper faces of the extended portions 33 of the body and provided with slots 59 through which bolts 60 may be passed and secured by nuts 61. These bolts 60 will be passed through such openings 34 of the extended portions of the body as will bring the supporting braces 56 into close engagement with the side faces of the axle and permit such braces to hold the device against swinging movement with respect to the axle. The link 28, in this instance, instead of being connected to a spring, is merely pivotally connected to the end of the drag link 62 of the steering mechanism of the vehicle, in the same manner in which the steering arm of the wheel knuckle would be connected. Because of this, the wheel upon the spindle of my device may be turned by the steering mechanism in the same manner in which the ordinary wheel would be turned and the vehicle may, therefore, be successfully steered while being run or towed to a repair shop. If the clamp 42 does not fit tightly enough about the axle and the links 56 do not offer enough wedging resistance to the head of the axle so that there is a tendency for the device to slip toward the free end of the axle and permit the axle to drop against the arms 12 and 13, a block of wood or other suitable material may be interposed between such arms and the free end of the axle. Such a block must, of necessity, differ in shape and size according to the type of axle to which the spindle is being applied and as it forms no part of my present invention I have not illustrated it in the drawings.

From the foregoing description, it will be apparent that I have provided a wrecking device by means of which a wheel may be attached to either end of either vehicle axle in case of a broken axle or spindle and in which, if the device is attached to a forward axle, provision is made for turning the wheel for steering purposes. Of course, it will be understood that I do not wish to be limited to the specific details of construction illustrated and described, as any changes, within the scope of the appended claims, may be made at any time, without in the slightest degree departing from the spirit of my invention.

Having thus described the invention, what is claimed as new is:

1. A device of the character described including a body adapted to engage against one end and the lower face of a vehicle axle, means for clamping the body in place, and a wheel spindle carried by the body, said spindle being free for swinging movement in a horizontal plane, and a link connected to the spindle and adapted for attachment to a portion of a vehicle.

2. A device of the character described including a body adapted to engage against one end and the lower face of a vehicle axle, means for clamping the body in place, and a wheel spindle carried by the body, said spindle being free for swinging movement in a horizontal plane, and a link connected to the spindle and adapted for attachment to the drag link of the vehicle steering mechanism.

3. A device of the character described including a body adapted to engage against one end and the lower face of an axle and to receive a brake drum carried thereby, curved supporting braces carried by the body and engaging the brake drum, means for clamping one end of the body to the axle, and a spindle extending from the body.

4. A device of the character described including a body adapted to engage against one end and the lower face of an axle, supporting braces carried by the body to engage the axle, means for clamping one end of the body to the axle, and a wheel receiving spindle carried by the body.

5. A device of the character described including a body adapted to engage against one end and the lower face of a vehicle axle, braces extending longitudinally of the body to engage a part of the vehicle, and means for securing one end of the body to the axle.

6. A device of the character described including a body adapted to engage at one end against one end of the axle and at its opposite end against the lower face of the axle, the intermediate portion of the body being arcuate to form a brake drum receiving seat, arms extending laterally from that end of the body engaging against the forward end of the axle, and retaining braces adjustably connected at one end to the arms and at their other ends to the other end of the body to form with the intermediate portion of the body a brake drum receiving cradle.

In testimony whereof I affix my signature in presence of two witnesses.

FRANK CLEMENT. [L. S.]

Witnesses:
W. D. BEALL, Jr.,
T. O. COWAN.

Copies of this patent may be obtained for five cents each, by addressing the "Commissioner of Patents, Washington, D. C."